(12) United States Patent
Fullmer et al.

(10) Patent No.: US 6,863,808 B2
(45) Date of Patent: Mar. 8, 2005

(54) MODULAR WATER SOFTENER SYSTEM

(75) Inventors: David M. Fullmer, Georgetown, IN (US); Richard L. Butsch, Louisville, KY (US)

(73) Assignee: General Electric Company, Schenectady, NY (US)

(*) Notice: Subject to any disclaimer, the term of this patent is extended or adjusted under 35 U.S.C. 154(b) by 347 days.

(21) Appl. No.: 10/026,612

(22) Filed: Dec. 20, 2001

(65) Prior Publication Data

US 2003/0116492 A1 Jun. 26, 2003

(51) Int. Cl.[7] .......................... B01D 24/00; B01D 29/50
(52) U.S. Cl. ................. 210/190; 210/279; 210/284; 210/288; 210/290; 210/687
(58) Field of Search ................. 210/190, 284, 210/279, 288, 290, 687

(56) References Cited

U.S. PATENT DOCUMENTS

| | | | | |
|---|---|---|---|---|
| 3,385,441 A | * | 5/1968 | Lyall | 210/190 |
| 4,332,678 A | * | 6/1982 | Spiegl | 210/86 |
| 4,518,505 A | * | 5/1985 | Lim et al. | 210/712 |
| 5,464,532 A | * | 11/1995 | Nowlin et al. | 210/190 |
| 5,651,880 A | * | 7/1997 | Johnson | 210/126 |
| 5,685,975 A | | 11/1997 | Joubert et al. | |
| 5,751,598 A | * | 5/1998 | Zabinski et al. | 210/190 |
| 5,858,216 A | | 1/1999 | Wigen | |
| 6,090,285 A | * | 7/2000 | Chau | 210/284 |
| 6,214,214 B1 | | 4/2001 | Hansen et al. | |
| 6,238,567 B1 | * | 5/2001 | Moortele | 210/670 |
| 6,596,159 B1 | * | 7/2003 | Maruyama et al. | 210/139 |

* cited by examiner

Primary Examiner—Minh-Chau T. Pham
(74) Attorney, Agent, or Firm—George L. Rideout, Esq.; Armstrong Teasdale LLP (57) ABSTRACT

A water softener system including a hard water flow pipe through which hard water flows, a modular water softener assembly, and a regeneration tank is provided. The modular water softener assembly includes an elongated tube having a first end, a second end, a length extending therebetween, and a predetermined inner volume for storing an amount of water softening particles. The water softener assembly also includes a first end cap coupled to the tube at the first end having a first port in flow communication with the hard water flow pipe and a second port in flow communication with an outlet pipe through which soft water flows. The water softener assembly is supported by the hard water flow pipe and the outlet pipe. The regeneration tank contains a regenerate for regenerating the water softening particles and is in flow communication with the water softener assembly.

30 Claims, 5 Drawing Sheets

MODULAR WATER SOFTENER SYSTEM

BACKGROUND OF THE INVENTION

This invention relates generally to water softeners and, more particularly, to a modular water softener system installed on a hot-side of a water supply.

At least some known water softeners are configured to pass hard water through an ion exchange resin or mineral bed to remove hardness ions from the water. The ion exchange resin or mineral, to a limited extent, also removes dissolved iron through an ion exchange process. The ion exchange resin or mineral bed is recharged to restore its hardness and iron removal capability by passing brine through the resin or mineral bed and by backwashing.

In at least some known installations, however, an existing plumbing system might not allow for the installation of a water softener that treats both the cold and hot water supply without considerable modification that is often cost prohibitive. To offer most of the benefits of a whole-home water softener without significant plumbing modifications, a water softener can be used to soften only the hot water supply for the home. Such a water softener can be installed just prior to a water heater within the home. Unfortunately, these water softeners are relatively large (15,000 to 40,000 grain capacity) and are significantly over-sized when just treating a hot water supply for a typical home. Consequently, a home owner must incur an increased cost for installing and purchasing such a water softener, and must have sufficient room in close proximity to the water heater to allow for the installation.

BRIEF DESCRIPTION OF THE INVENTION

In one aspect, a water softener system including a hard water flow pipe through which hard water flows, a modular water softener assembly, and a regeneration tank is provided. The modular water softener assembly includes an elongated tube having a first end, a second end, a length extending therebetween, and a predetermined inner volume for storing an amount of water softening particles. The water softener assembly also includes a first end cap coupled to the tube at the first end having a first port in flow communication with the hard water flow pipe and a second port in flow communication with an outlet pipe through which soft water flows. The water softener assembly is supported by the hard water flow pipe and the outlet pipe. The regeneration tank contains a regenerate for regenerating the water softening particles and is in flow communication with the water softener assembly.

In another aspect, a water softener system with a water softening capacity of about 3,000 grains that includes a hard water flow pipe through which hard water flows, a modular water softener assembly, and a regeneration tank is provided. The modular water softener assembly includes an elongated tube having a first end, a second end, a length extending therebetween, and a predetermined inner volume for storing an amount of water softening particles. The water softener assembly also includes a first end cap coupled to the tube at the first end having a first port in flow communication with the hard water flow pipe and a second port in flow communication with an outlet pipe through which soft water flows. The water softener assembly is supported by the hard water flow pipe and the outlet pipe. The regeneration tank contains a regenerate for regenerating the water softening particles and is in flow communication with the water softener assembly.

In another aspect, a hot-side water softener system including a hard water flow pipe through which hard water flows, a water heater, a modular water softener assembly, and a regeneration tank is provided. The water heater includes a tank for holding a quantity of water, a cold water inlet pipe in flow communication with the tank, a hot water outlet pipe extending in communication with the tank, and a burner configured to heat the water held in the tank. The modular water softener assembly includes an elongated tube having a first end, a second end, a length extending therebetween, and a predetermined inner volume for storing an amount of water softening particles. The water softener assembly also includes a first end cap coupled to the tube at the first end having a first port in flow communication with the hard water flow pipe and a second port through which soft water flows in flow communication with the water heater cold water inlet pipe. The regeneration tank contains a regenerate for regenerating the water softening particles and is in flow communication with the water softener assembly.

In another aspect, a hot-side water softener system with a water softening capacity of about 3,000 grains that includes a hard water flow pipe through which hard water flows, a water heater, a modular water softener assembly, and a regeneration tank is provided. The water heater includes a tank for holding a quantity of water, a cold water inlet pipe in flow communication with the tank, a hot water outlet pipe extending in communication with the tank, and a burner configured to heat the water held in the tank. The modular water softener assembly includes an elongated tube having a first end, a second end, a length extending therebetween, and a predetermined inner volume for storing an amount of water softening particles. The water softener assembly also includes a first end cap coupled to the tube at the first end having a first port in flow communication with the hard water flow pipe and a second port through which soft water flows in flow communication with the water heater cold water inlet pipe. The water softener assembly is supported by at least one of the hard water flow pipe, the water heater cold water inlet pipe, and the water heater. The regeneration tank contains a regenerate for regenerating the water softening particles and is in flow communication with the water softener assembly.

In another aspect, a method for installing a modular water softener assembly between and supported by a hard water flow pipe and an outlet pipe is provided. The water softener assembly employs an elongated tube having a first end, a second end, a length extending therebetween, and a predetermined inner volume for storing an amount of water softening particles. The water softening assembly further employs a first end cap coupled to the tube at the first end having a first port and a second port. The method includes providing the hard water flow pipe through which hard water flows, providing the outlet pipe through which soft water flows, coupling the first port to the hard water flow pipe such that the first port is in flow communication with the hard water flow pipe, and coupling the second port to the outlet pipe such that the second port is in flow communication with the outlet pipe.

DETAILED DESCRIPTION OF THE INVENTION

Figure 1:
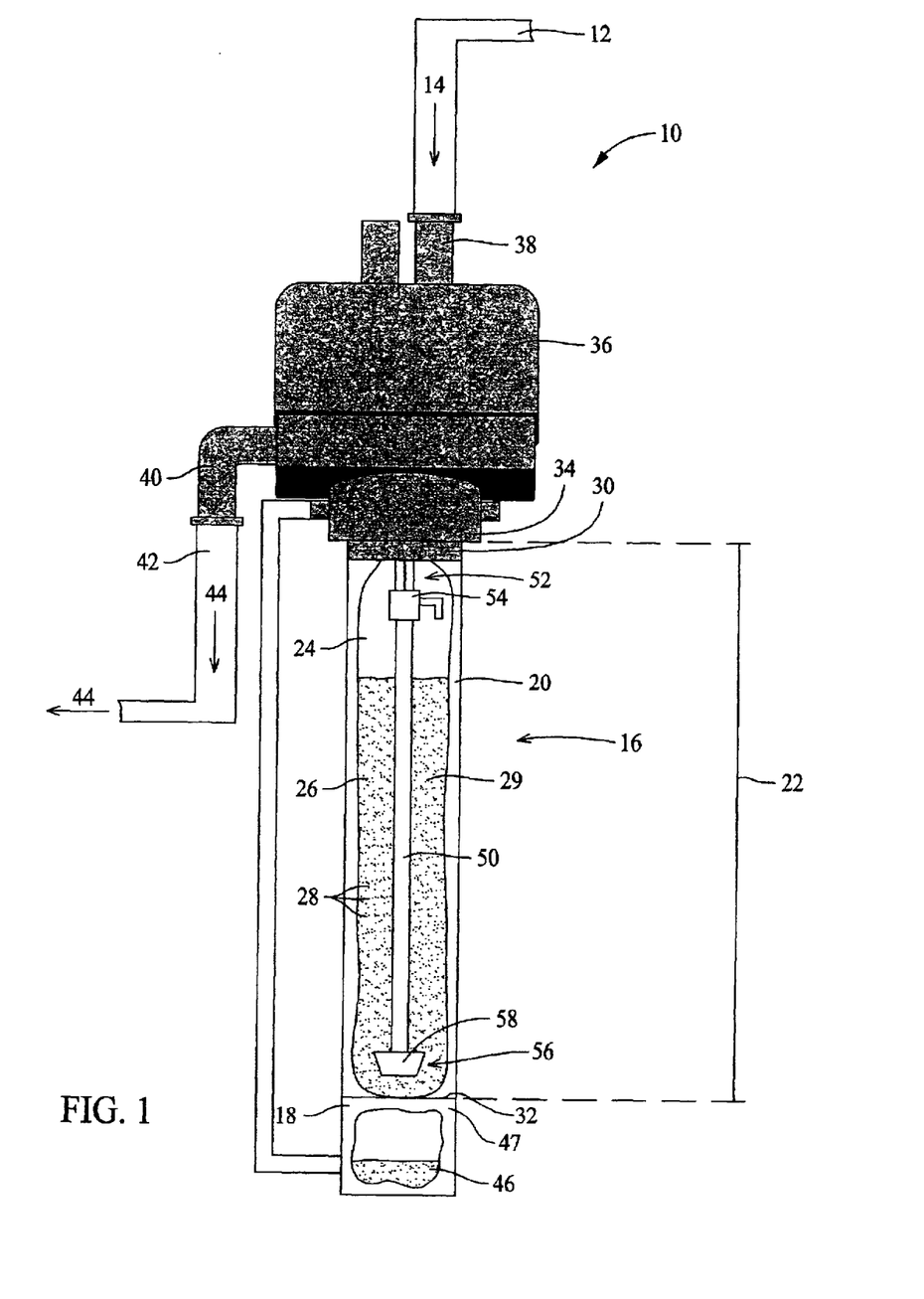
FIG. 1 is a cross-sectional view of a modular water softener system.

FIG. 1 is a cross-sectional view of a modular water softener system 10 including a hard water flow pipe 12 through which hard water 14 flows, a water softener assembly 16, and a regeneration tank 18. Water softener assembly 16 includes an elongated tube 20 that has a length 22 and a predetermined inner volume 24 therein for storing an amount 26 of water softening particles 28 that form a water softening bed 29. In at least one embodiment, water softening particles 28 are water softening mineral beads that form a water softening mineral bed within predetermined inner volume 24. In an alternative embodiment, water softening particles 28 are water softening resin beads that form a water softening resin bed within predetermined inner volume 24. Tube 20 also has a first end 30, and a second end 32. A first end cap 34 having a valve assembly 36 coupled thereto is coupled to tube 20 at first end 30. First end cap 34 has a first port 38 in flow communication with hard water flow pipe 12 and a second port 40 in flow communication with an outlet pipe 42 through which soft water 44 flows. Valve assembly 36 includes a plurality of valves (not shown) and piping (not shown). In an exemplary embodiment, and as described in more detail below, valve assembly 36 controls the flow of hard water 14 and soft water 44 to and from water softener assembly 16.

Regeneration tank 18, which is in flow communication with water softener assembly 16, contains a regenerate 46 for regenerating water softening bed 29. In an exemplary embodiment, regeneration tank 18 has a first end 47 that is coupled to tube second end 32 such that regeneration tank 18 can be supported by water softener assembly 16.

In an exemplary embodiment, a riser pipe 50 extends longitudinally within water softener tube 20. Riser pipe 50 includes a first distributor end 52 adjacent to first end 30 having a first distributor 54 coupled thereto, and a second distributor end 56 adjacent to second end 32 having a second distributor 58 coupled thereto. First distributor 54 is in flow communication with riser pipe 50, first port 38, second port 40, and predetermined inner volume 24. First distributor 54 is configured to be able to reverse its flow direction. Second distributor 58 is in flow communication with riser pipe 50 and predetermined inner volume 24, and is also configured to be flow reversible.

Water softener system 10 has a water softening capacity that equals the volumetric flow rate at which water softener assembly 16 having predetermined inner volume 24 and length 22 can effectively convert hard water 14 into soft water 44. In at least one embodiment, a home owner selects a water softener system 10 based on a desired water softening capacity. The water softening capacity of water softener system 10 is based on predetermined inner volume 24 such that, for example, if a home owner wanted to increase the water softening capacity of water softener system 10, the home owner would only have to increase predetermined inner volume 24 and amount 26 of water softening particles 28. In an exemplary embodiment, water softener assembly 16 is modular, and accordingly, a home owner could increase predetermined inner volume 24 and amount 26 of water softening particles 28 by increasing tube length 22 either with an additional section of tube 20 or by replacing tube 20 with a tube having an increased length 22. Additionally, since water softener assembly 16 is modular, assuming water softener assembly 16 becomes defective or requires replacement, water softener assembly 16 can be easily removed and a new water softener assembly 16 can be installed without having to install the other parts of water softener system 10.

In an exemplary embodiment, water softener system 10 has a water softening capacity that ranges between approximately 2,000 grains and approximately 9,000 grains. More specifically, in an exemplary embodiment, water softener system 10 has a water softening capacity of about 3,000 grains and tube length 22 of about 18 inches.

Figure 2:
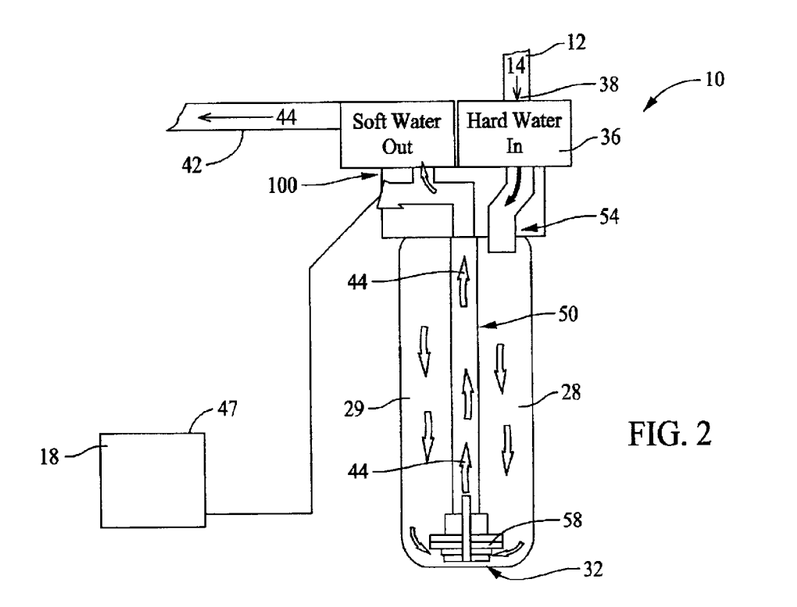
FIG. 2 is a schematic view illustrating the operation of the water softener system shown in FIG. 1 during a water softening cycle.

FIGS. 2–6 are schematics illustrating the operation of an exemplary embodiment of water softener system 10. Water softener system 10 can be placed in either a "Softening Cycle" 100 or a "Regeneration Cycle" 102. FIG. 2 illustrates the operation of an exemplary embodiment of water softener system 10 during Softening Cycle 100. During Softening Cycle 100, hard water 14 flows through hard water flow pipe 12, first port 38, valve assembly 36, and first distributor 54 into tube 20. Hard water 14 then passes through water softening bed 29 downwardly toward second end 32. The water softening process, a known ion exchange process, occurs as hard water 14 passes through water softening bed 29 converting hard water 14 into soft water 44. Soft water 44 enters second distributor 58. Soft water 44 travels upwardly through riser pipe 50 to outlet pipe 42. Soft water 44 flows through outlet pipe 42 to a desired location. In at least one embodiment, soft water 44 flows through outlet pipe 42 to a water heater (not shown in FIG. 2).

Briefly, ion exchange is a reversible chemical process of exchanging hard water ions for soft water ions. Calcium and magnesium are typically considered the hardness ions, while sodium is typically considered the softness ions. In at least some known water softeners, ion exchange takes place in a mineral or resin bed made up of a tiny bead-like material that can include styrene, divynlbenzene, or zeolites. The beads, having a negative charge, attract and hold positively charged ions such as sodium, but will exchange them whenever the beads encounter another positively charged ion such as calcium or magnesium minerals. This ion exchange happens relatively easily since the sodium ions have a positive charge of only one, while the magnesium and calcium have a more powerful positive charge of two.

Figure 3:
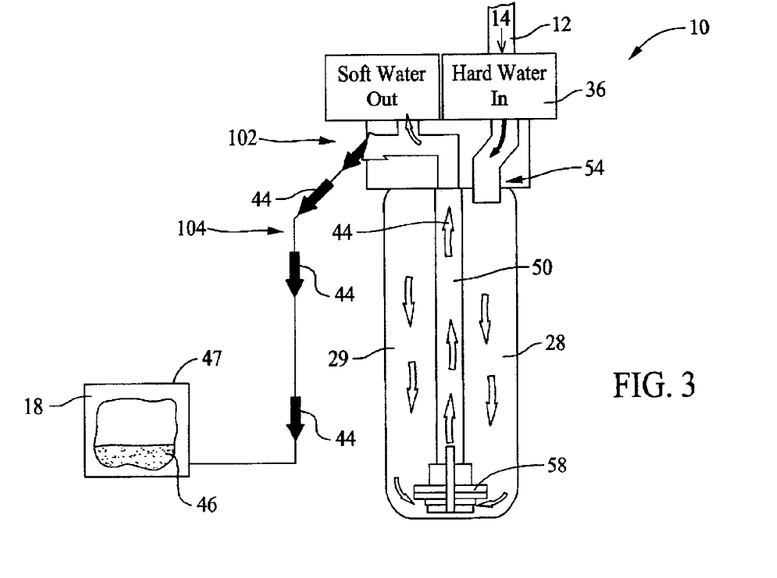
FIG. 3 is a schematic view illustrating the operation of the water softener system shown in FIG. 1 during a brine fill stage of a regeneration cycle.

FIG. 3 illustrates the operation of an exemplary embodiment of water softener system 10 during a "Brine Fill Stage" 104 of Regeneration Cycle 102. During Brine Fill Stage 104, soft water 44 is diverted by valve assembly 36 into regeneration tank 18 and mixes with regenerate 46 such that regenerate 46 is placed in a liquid solution. In at least some known water softener systems, regenerate 46 is sodium or salt. Salt dissolved in water is known as brine. Therefore, this stage of Regeneration Cycle 102, when soft water 44 is diverted into regeneration tank 18 to mix with regenerate 46, e.g., to make brine, is referred to as Brine Fill Stage 104.

Figure 4:
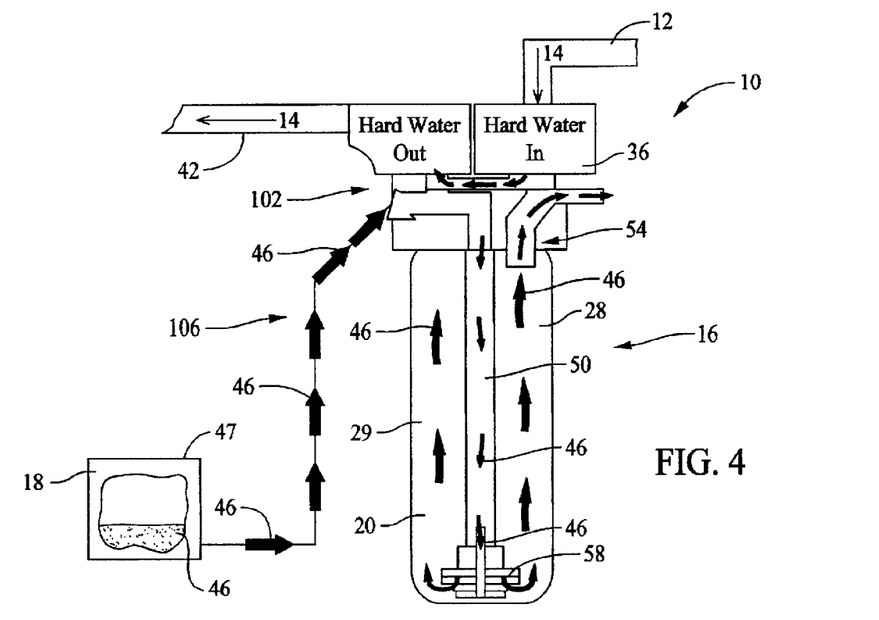
FIG. 4 is a schematic view illustrating the operation of the water softener system shown in FIG. 1 during a brining stage of a regeneration cycle.

FIG. 4 illustrates the operation of an exemplary embodiment of water softener system 10 during "Brining Stage"

106 of Regeneration Cycle 102. Brining Stage 106 typically follows Brine Fill Stage 104 (shown in FIG. 3) during Regeneration Cycle 102. During Brining Stage 106, water softener assembly 16 is taken "offline" from hard water flow pipe 12. Valve assembly 36 diverts hard water 14 from hard water flow pipe 12 to outlet pipe 42. Thus, during Brining Stage 106, soft water 44 (not shown in FIG. 4) is, at least temporarily, no longer generated by water softener assembly 16. Rather, after water softener assembly 16 is taken offline, water softener assembly 16 reverses flow direction and regenerate 46 flows from regeneration tank 18 through valve assembly 36 and into riser pipe 50. Regenerate 46 then flows through riser pipe 50 to second distributor 58 and into tube 20. Regenerate 46 then flows upwardly through water softening bed 29 such that water softening bed 29 is regenerated to facilitate future water softening processes. After regenerate 46 regenerates water softening bed 29, valve assembly 36 closes a valve (not shown) to regeneration tank 18 and opens a valve (not shown) that allows regenerate 46 from within tube 20 to be discharged from tube 20.

Figure 5:
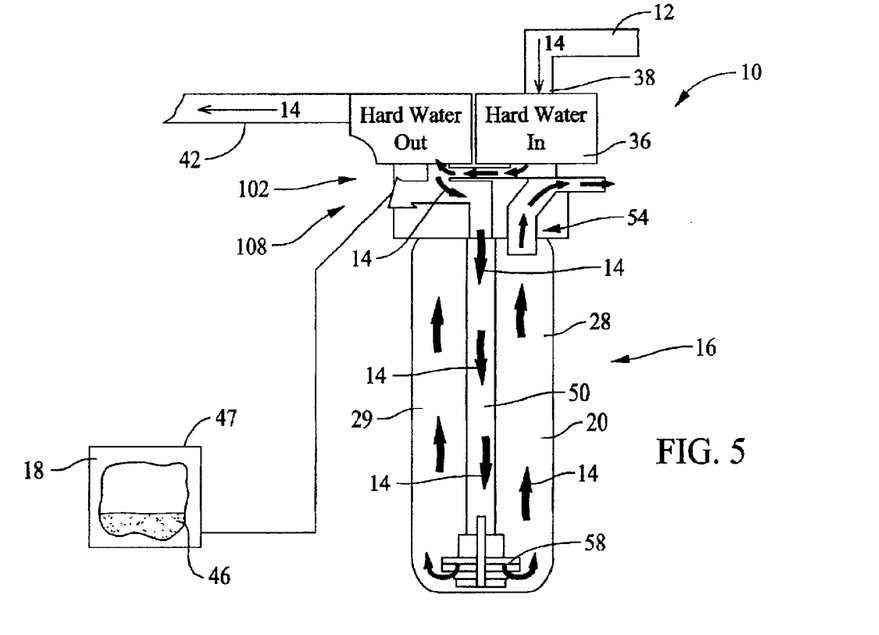
FIG. 5 is a schematic view illustrating the operation of the water softener system shown in FIG. 1 during a backwash stage of a regeneration cycle.

FIG. 5 illustrates the operation of an exemplary embodiment of water softener system 10 during a "Backwash Stage" 108 of Regeneration Cycle 102. Backwash Stage 108 typically follows Brining Stage 106 (shown in FIG. 4) during Regeneration Cycle 102. During Backwash Stage 108, water softener assembly 16 remains offline from hard water flow pipe 12. Valve assembly 36 continues to divert hard water 14 from hard water flow pipe 12 to outlet pipe 42. Thus, during Backwash Stage 108, soft water 44 (not shown in FIG. 5) is, at least temporarily, no longer generated by water softener assembly 16. Rather, during Backwash Stage 108, water softener assembly 16 continues in a reverse flow direction. However, regenerate 46 no longer flows from regeneration tank 18 into water softener assembly 16. Rather, hard water 14 flows quickly through first port 38, and into valve assembly 36. A portion of hard water 14 entering valve assembly 36 is directed into riser pipe 50. Hard water 14 then flows through riser pipe 50 to second distributor 58 and into tube 20. Hard water 14 then flows upwardly through water softening bed 29 such that accumulated iron, dirt, and sediment are removed from water softening bed 29, and is discharged from tube 20.

Figure 6:
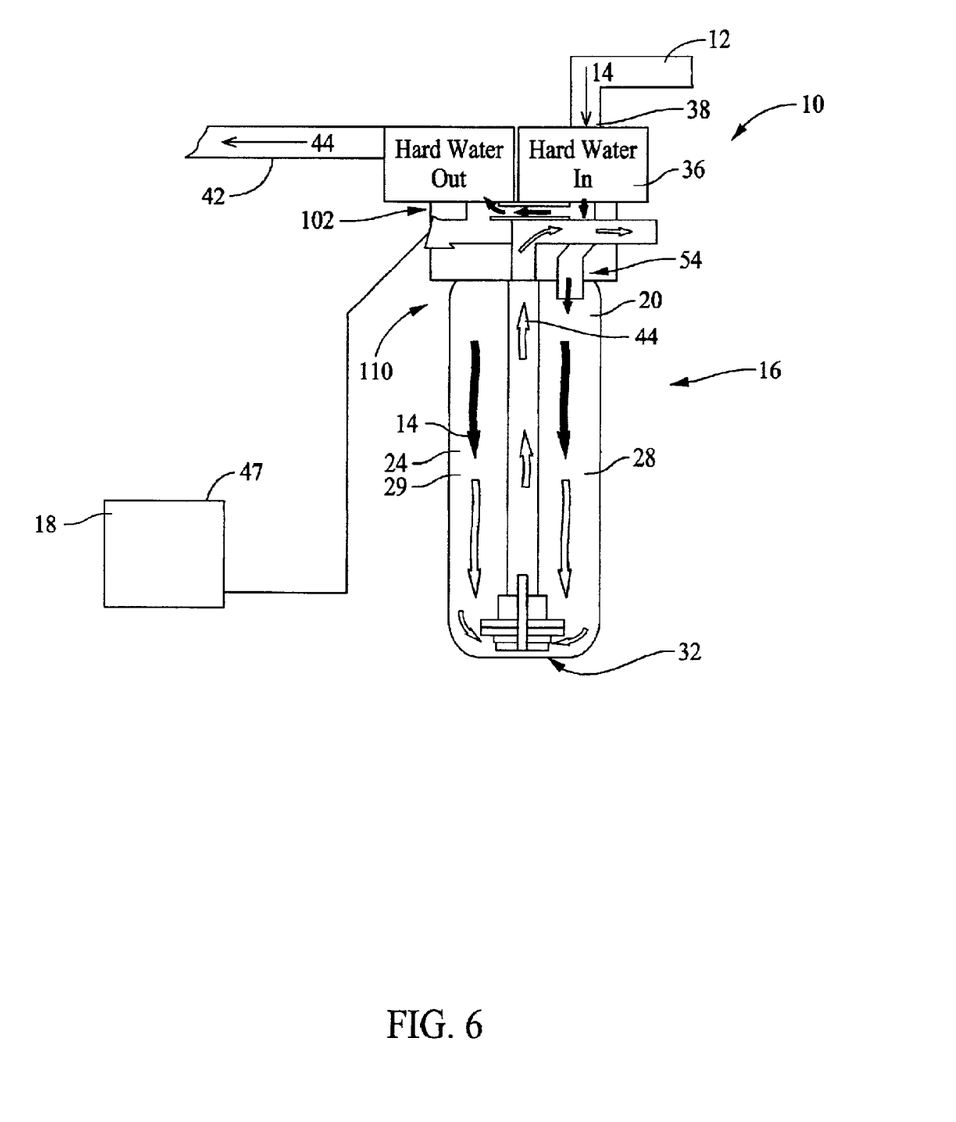
FIG. 6 is a schematic view illustrating the operation of the water softener system shown in FIG. 1 during a fast rinse stage of a regeneration cycle.

FIG. 6 illustrates the operation of an exemplary embodiment of water softener system 10 during "Fast Rinse Stage" 110 of Regeneration Cycle 102. Fast Rinse Stage 110 typically follows Backwash Stage 108 (shown in FIG. 5) during Regeneration Cycle 102. During Fast Rinse Stage 110, water softener assembly 16 packs water softening bed 29 prior to being brought back "on-line." Hard water 14 flows quickly through hard water flow pipe 12, first port 38, valve assembly 36, and first distributor 54 into tube 20. Hard water 14 then passes quickly through water softening bed 29 toward second end 32 such that water softening bed 29 is compacted within predetermined inner volume 24 of tube 20. Rinse water is discharged from tube 20. Thus, during Fast Rinse Stage 110, water softener assembly 16 remains offline and a portion of hard water 14 flows through pipe 12 to outlet pipe 42.

After Fast Rinse Stage 110 is completed, water softener assembly 16 returns to Softening Cycle 100 and soft water 44 is generated by water softener assembly 16.

Figure 7:
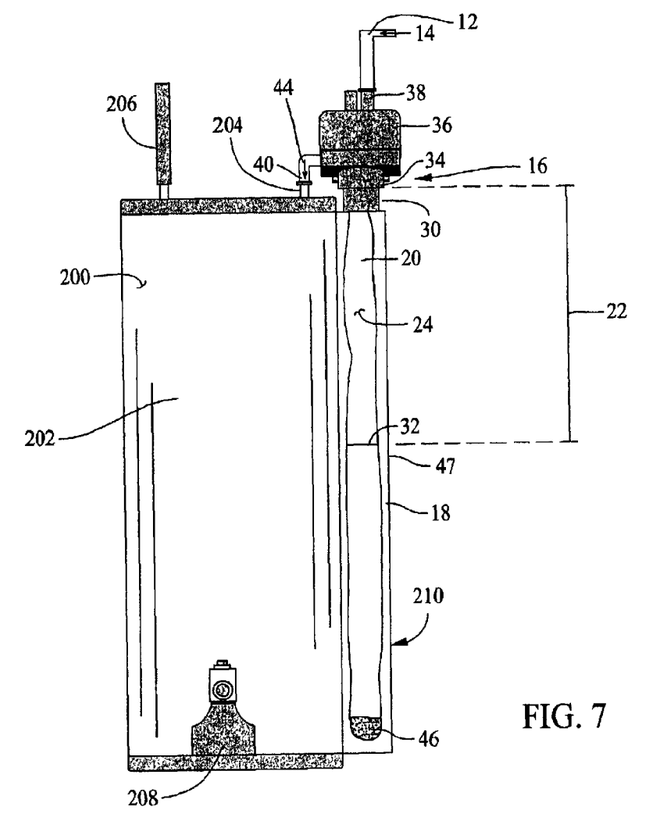
FIG. 7 is a partial cross-sectional view of the modular water softener assembly shown in FIG. 1 attached to a water heater.

FIG. 7 is a partial cross-sectional view of modular water softener assembly 16 attached to a water heater 200. Water heater 200 includes a tank 202 for holding a quantity of water, a cold water inlet pipe 204 in flow communication with tank 202, a hot water outlet pipe 206 extending in communication with tank 202, a burner 208 configured to heat the water held in tank 202, and a stack 210 coupled to tank 202.

Hard water flow pipe 12 through which hard water 14 flows is in flow communication with water softener assembly 16. Regeneration tank 18 is also in flow communication with water softener assembly 16. Regeneration tank 18, which is partially shown in FIG. 7, has first end 47 which is coupled to water softener assembly 16 at tube second end 32. Water softener assembly 16 includes elongated tube 20 that has length 22 and a predetermined inner volume 24 therein for storing water softening particles 28 (not shown in FIG. 7). Tube 20 also has first end 30, and second end 32. A first end cap 34 having a valve assembly 36 coupled thereto is coupled to tube 20 at first end 30. First end cap 34 has a first port 38 in flow communication with hard water flow pipe 12 and second port 40 in flow communication with cold water inlet pipe 204 through which soft water 44 flows. Valve assembly 36 includes a plurality of valves (not shown) and piping (not shown). In an exemplary embodiment, and as described in more detail hereinabove, valve assembly 36 controls the flow of hard water 14 and soft water 44 to and from water softener assembly 16.

In an exemplary embodiment, water softener assembly 16 is coupled to and supported by at least one of hard water flow pipe 12, cold water inlet pipe 204, and stack 210. More specifically, in at least one embodiment, water softener assembly 16 is coupled to hard water flow pipe 12 at first port 38, and is coupled to cold water inlet pipe 204 at second port 40 such that water softener assembly 16 is supported by either hard water flow pipe 12, cold water inlet pipe 204 or both hard water flow pipe 12 and cold water inlet pipe 204. In other words, water softener assembly 16 is coupled in-line with hard water flow pipe 12 and cold water inlet pipe 204 such that water softener assembly 16 is supported by water flow pipe 12 and cold water inlet pipe 204. In at least another embodiment, water heater 200 has stack 210 that is configured such that tube 20, and regeneration tank 18 which is coupled to tube 20, is inserted within stack 210 and coupled to stack 210 such that water softener assembly 16 and regeneration tank 18 are supported by stack 210.

Because water softener assembly 16 is relatively small, it can be supported by at least one of hard water flow pipe 12, cold water inlet pipe 204, and stack 210. Consequently, a home owner will experience a significant time and cost savings by installing water softener system 10 as compared to the known larger water softener systems. Moreover, a home owner would only need a relatively small amount of floor space near water heater 200 to install water softener system 10 because regeneration tank 18 can be located under water softener assembly 16. Whereas, with the known larger water softener systems, a home owner must have a significant amount of floor space near the water heater to position the entire, much larger, water softener system.

In an exemplary embodiment, water softener system 10 has a water softening capacity that equals the volumetric flow rate at which water softener assembly 16 having predetermined inner volume 24 and length 22 can effectively convert hard water 14 into soft water 44. In at least one embodiment, a home owner selects a water softener system 10 based on a desired water softening capacity. The water softening capacity of water softener system 10 is based on predetermined inner volume 24 such that, for example, if a home owner wanted to increase the water softening capacity, the home owner could increase predetermined inner volume 24 and amount 26 of water softening particles 28. In one embodiment, a home owner could increase predetermined inner volume 24 and amount 26 of water softening particles 28 by increasing tube length 22 either with an additional section of tube 20 or by replacing tube 20 with a tube having an increased length 22.

In at least one embodiment, water softening particles 28 that form water softening bed 29 are water softening mineral beads that form a water softening mineral bed within predetermined inner volume 24. In an alternative embodiment, water softening particles 28 are water softening resin beads that form a water softening resin bed within predetermined inner volume 24.

In an exemplary embodiment, water softener system 10 has a water softening capacity that ranges between approximately 2,000 grains and approximately 9,000 grains. More specifically, in an exemplary embodiment, water softener system 10 has a water softening capacity of about 3,000 grains and tube length 22 of about 18 inches. A water softener system having a 3,000 grain capacity with a tube length of about 18 inches is based on the assumptions that a typical home will on average use approximately 48 gallons per day of hot water, the water has a hardness of about 10 grains per gallon, and the water softener assembly tube has a diameter of about 3 inches. As stated above, at least some known water softener systems are sized to soften both cold and hot water. These water softener systems are very large and typically have a water softening capacity of between 15,000 and 40,000 grains. Thus, these known water softener systems are significantly over-sized for a typical home owner that only wants to soften a home's hot water. Accordingly, just from an operational standpoint, water softener system 10 will also provide a home owner with significant savings as compared to operating a known larger water softener systems.

In operation, during Softening Cycle 100, hard water 14 flows through hard water flow pipe 12, first port 38, valve assembly 36, and first distributor 54 (not shown in FIG. 7) into tube 20. Hard water 14 then passes through water softening mineral bed 29 (not shown in FIG. 7) downwardly toward second end 32. The water softening process occurs as hard water 14 passes through water softening bed 29 converting hard water 14 into soft water 44. Soft water 44 enters second distributor 58 (not shown in FIG. 7). Soft water 44 travels upwardly through riser pipe 50 (not shown in FIG. 7) to first distributor 54 which directs soft water 44 to cold water inlet pipe 204. Soft water 44 then enters tank 202, where it is heated by burner 208. After soft water 44 is heated within tank 202, soft water 44 exits tank 202 through hot water outlet pipe 206, which carries heated soft water 44 throughout a home or office. During Regeneration Cycle 102, water softener system 10 undergoes Brine Fill Stage 104, Brining Stage 106, Backwash Stage 108, and Fast Rinse Stage 110 so that water softening bed 29 is regenerated to be used in future water softening processes.

Water softener system 10 offers most of the benefits of a whole-home water softener system without requiring significant plumbing modifications. More specifically, water softener system 10 can be coupled to and supported by existing plumbing and used to soften just the hot water supply for a home or office. Thus, water softener system 10 provides significant time and cost savings to the home owner through both its installation and operation. Water softener system 10 is also relatively small and can be sized for a particular home or office based on the home or office's hot water usage. Moreover, water softener system 10 is modular, and therefore, its water softening capacity can be increased or decreased as needed.

While the invention has been described in terms of various specific embodiments, those skilled in the art will recognize that the invention can be practiced with modification within the spirit and scope of the claims.

What is claimed is:

1. A water softener system comprising:

a hard water flow pipe through which hard water flows;

a modular water softener assembly comprising an elongated tube having a first end, a second end, a length extending therebetween, and a predetermined inner volume for storing an amount of water softening particles, said water softener assembly further comprising a first end cap coupled to said tube at said first end having a first port in flow communication with said hard water flow pipe and a second port in flow communication with an outlet pipe through which soft water flows, said water softener assembly supported by said hard water flow pipe and said outlet pipe; and a regeneration tank positioned outside said water softener assembly and in flow communication with said water softener assembly, said regeneration tank containing a regenerate for regenerating said water softening particles, said regeneration tank comprises a first end coupled to said tube second end such that said regeneration tank is supported by said water softener assembly.

2. A system in accordance with claim 1 wherein said water softener assembly system further comprises a riser pipe extending longitudinally within said water softener tube and comprising a first distributor end adjacent said first tube end having a first distributor, and a second distributor end adjacent said second tube end having a second distributor, said first and second distributors are flow reversible, said first distributor is in flow communication with said riser pipe, said tube first port, said tube second port, and said predetermined inner volume, said second distributor is in flow communication with said riser pipe and said predetermined inner volume.

3. A system in accordance with claim 1 wherein said water softener system further comprises a water softening capacity, said water softening capacity equals a volumetric flow rate at which said water softener assembly having a predetermined inner volume can effectively convert hard water into soft water.

4. A system in accordance with claim 1 wherein said water softening particles comprise water softening mineral beads forming a water softening mineral bed.

5. A system in accordance with claim 1 wherein said water softening particles comprise water softening resin beads forming a water softening resin bed.

6. A system in accordance with claim 1 wherein said tube predetermined inner volume is based on a desired water softening capacity from said water softener system.

7. A system in accordance with claim 6 wherein said desired water softening capacity can be increased by increasing said tube length such that said predetermined inner volume and said amount of water softening particles are increased.

8. A system in accordance with claim 6 wherein said desired water softening capacity ranges between approximately a 2,000 grain capacity and approximately a 9,000 grain capacity.

9. A system in accordance with claim 8 wherein said desired water softening capacity ranges between approximately a 2,500 grain capacity and approximately a 6,000 grain capacity.

10. A system in accordance with claim 9 wherein said desired water softening capacity is approximately a 3,000 grain capacity.

11. A water softener system comprising:
a hard water flow pipe through which hard water flows;
a modular water softener assembly comprising an elongated tube having a first end, a second end, a length extending therebetween, and a predetermined inner volume for storing an amount of water softening particles, said water softener assembly further comprising a first end cap coupled to said tube at said first end having a first port in flow communication with said hard water flow pipe and a second port in flow communication with an outlet pipe through which soft water flows, said water softener assembly supported by said hard water flow pipe and said outlet pipe;
a water softening capacity of about a 3,000 grain capacity; and
a regeneration tank positioned outside said water softener assembly and in flow communication with said water softener assembly, said regeneration tank containing a regenerate for regenerating said water softening particles, said regeneration tank comprises a first end coupled to said tube second end such that said regeneration tank is supported by said water softener assembly.

12. A system in accordance with claim 11 wherein said tube length is about 18 inches.

13. A hot-side water softener system comprising:
a hard water flow pipe through which hard water flows;
a water heater comprising a tank for holding a quantity of water, a cold water inlet pipe in flow communication with said tank, a hot water outlet pipe extending in communication with said tank, and a burner configured to heat said water held in said tank;
a modular water softener assembly comprising an elongated tube having a first end, a second end, a length extending therebetween, and a predetermined inner volume for storing an amount of water softening particles, said water softener assembly further comprising a first end cap coupled to said tube at said first end having a first port in flow communication with said hard water flow pipe and a second port through which soft water flows in flow communication with said water heater cold water inlet pipe; and
a regeneration tank positioned outside said water softener assembly and in flow communication with said water softener assembly, said regeneration tank containing a regenerate for regenerating said water softening particles, said regeneration tank comprises a first end coupled to said tube second end such that said regeneration tank is supported by said water softener assembly.

14. A system in accordance with claim 13 wherein said water softener assembly is supported by said hard water flow pipe and said water heater cold water inlet pipe.

15. A system in accordance with claim 13 wherein said water softener assembly is configured to be supported by said water heater.

16. A system in accordance with claim 13 wherein said water softener system converts hard water supplied by said hard water flow pipe into soft water by passing hard water through said water softening particles within said tube, soft water supplied to said water heater through said cold water inlet pipe.

17. A system in accordance with claim 16 wherein said water softening particles comprise water softening mineral beads forming a water softening mineral bed.

18. A system in accordance with claim 16 wherein said water softening particles comprise water softening resin beads forming a water softening resin bed.

19. A system in accordance with claim 13 wherein said water softener system further comprises a water softening capacity, said water softening capacity equals a volumetric flow rate at which said water softener assembly having a predetermined inner volume can effectively convert hard water into soft water.

20. A system in accordance with claim 13 wherein said tube predetermined inner volume is based on a desired water softening capacity from said water softener system.

21. A system in accordance with claim 20 wherein said desired water softening capacity can be increased by increasing said tube length such that said predetermined inner volume and said amount of water softening particles are increased.

22. A system in accordance with claim 20 wherein said desired water softening capacity ranges between approximately a 2,000 grain capacity and approximately a 9,000 grain capacity.

23. A system in accordance with claim 22 wherein said desired water softening capacity ranges between approximately a 2,500 grain capacity and approximately a 6,000 grain capacity.

24. A system in accordance with claim 23 wherein said desired water softening capacity is approximately a 3,000 grain capacity.

25. A hot-side water softener system comprising:
a hard water flow pipe through which hard water flows;
a water heater comprising a tank for holding a quantity of water, a cold water inlet pipe in flow communication with said tank, a hot water outlet pipe extending in communication with said tank, and a burner configured to heat said water held in said tank;
a modular water softener assembly comprising an elongated tube having a first end, a second end, a length extending therebetween, and a predetermined inner volume for storing an amount of water softening particles, said water softener assembly further comprising a first end cap coupled to said tube at said first end having a first port in flow communication with said hard water flow pipe and a second port through which soft water flows in flow communication with said water heater cold water inlet pipe, said water softener assembly is supported by at least one of said hard water flow pipe, said water heater cold water inlet pipe, and said water heater;
a water softening capacity of about a 3,000 grain capacity; and
a regeneration tank positioned outside said water softener assembly and in flow communication with said water softener assembly, said regeneration tank containing a regenerate for regenerating said water softening particles, said regeneration tank comprises a first end coupled to said tube second end such that said regeneration tank is supported by said water softener assembly.

26. A system in accordance with claim 25 wherein said tube length is about 18 inches.

27. A method for installing a modular water softener assembly between and supported by a hard water flow pipe and an outlet pipe, the water softener assembly including an elongated tube having a first end, a second end, a length extending therebetween, and a predetermined inner volume for storing an amount of water softening particles, the water softener assembly further including a first end cap coupled to the tube at the first end having a fist port and a second port, said method comprising:

providing the hard water flow pipe through which hard water flows;

providing the outlet pipe through which soft water flows;

coupling the first port to the hard water flow pipe such that the first port is in flow communication with the hard water flow pipe;

coupling the second port to the outlet pipe such that the second port is in flow communication with the outlet pipe;

coupling an external regeneration tank outside and in flow communication with the water softener assembly; and coupling a first end of the external regeneration tank to the second end of the tube such that the regeneration tank is supported by the water softener assembly.

28. A method in accordance with claim 27 wherein installing the water softener assembly further comprises installing a water softener assembly having a predetermined inner volume that is based on a desired water softening capacity from said water softener assembly.

29. A method in accordance with claim 28 wherein installing the water softener assembly further comprises installing a water softener assembly configured to allow for an increase in the desired water softening capacity by increasing the tube length such that the predetermined inner volume and the amount of water softening particles are increased.

30. A method in accordance with claim 29 wherein installing the water softener assembly further comprises installing a water softener assembly having a desired water softening capacity of about 3,000 grains.

* * * * *